United States Patent [19]

Leiber

[11] Patent Number: 4,763,263
[45] Date of Patent: Aug. 9, 1988

[54] PROPULSION CONTROL USING LONGITUDINAL ACCELERATION TO DETERMINE SLIP THRESHOLDS

[75] Inventor: Heinz Leiber, Oberriexingen, Fed. Rep. of Germany

[73] Assignee: Daimler-Benz Aktiengesellschaft, Stuttgart, Fed. Rep. of Germany

[21] Appl. No.: 943,783

[22] Filed: Dec. 19, 1986

[30] Foreign Application Priority Data

Dec. 21, 1985 [DE] Fed. Rep. of Germany ....... 3545546

[51] Int. Cl.⁴ .............................................. B60T 8/32
[52] U.S. Cl. .................................... 364/426; 180/197; 303/100
[58] Field of Search ........................... 364/426, 431.07; 361/238; 180/197; 303/95, 97, 100

[56] References Cited

U.S. PATENT DOCUMENTS

| | | | |
|---|---|---|---|
| 4,358,164 | 11/1982 | Bleckmann et al. | 364/426 |
| 4,484,280 | 11/1984 | Brugger et al. | 364/426 |
| 4,606,586 | 8/1986 | Eckert et al. | 303/100 |
| 4,651,281 | 3/1987 | Masaki et al. | 364/426 |
| 4,675,819 | 6/1987 | Fennel | 364/426 |
| 4,701,855 | 10/1987 | Fennel | 180/197 |

*Primary Examiner*—Gary Chin
*Attorney, Agent, or Firm*—Barnes & Thornburg

[57] ABSTRACT

A propulsion control system for preventing an undesirable spinning of the vehicle wheels to be controlled, particularly of motor vehicles equipped with a multi-axle drive. The reference speed required for the slip threshold formation is formed from the speed of the uncontrolled driving wheels by an integration with a time constant derived from the longitudinal acceleration of the vehicle, by which a falsification of the reference speed signal is kept within limits in the case of a spinning of the uncontrolled wheels.

4 Claims, 2 Drawing Sheets

PROPULSION CONTROL USING LONGITUDINAL ACCELERATION TO DETERMINE SLIP THRESHOLDS

BACKGROUND AND SUMMARY OF THE INVENTION

The invention relates to a propulsion control system for motor vehicles to prevent undesirable spinning of the wheels especially in a multi-axle drive vehicle.

This type of system is shown in U.S. Pat. No. 4,484,280. That text concerns a motor vehicle with two axles, one of which, the rear axle or its wheels, are driven. Therefore the propulsion control system affects the rear wheels. For calculating the slip of the driven wheels or of the wheels that are to be controlled, these types of propulsion or wheel slip controls require the wheel circumference speeds of these wheels and the speed of the vehicle. Usually a speed comparison is carried out for each side of the vehicle, in which case the wheel that is not driven supplies the required vehicle speed information.

In the case of vehicles with all-wheel drive, the front wheels cannot be used for forming a driving speed signal, because, in the case of an excess of engine torque, all wheels may have higher slip values.

Systems are known that determine the driving speed by means of visual devices or by means of the Doppler effect. However, these systems are very costly.

It is the objective of the invention to provide the propulsion control system that is known for vehicles with one driven axle operable also for vehicles with all-wheel drive without requiring costly systems for determining the driving speed.

This and other objects of the invention are obtained by determining the reference speed required for the slip threshold information by integrating the speed of an uncontrolled drive wheel by an integrating circuit with a time constant. The time constant is derived by integrating the longitudinal acceleration of the vehicle, subtracting the integrated signal from the longitudinal acceleration and adding a constant value assigned the constant value of acceleration to the difference. This signal is used to vary the time constant of an integrating circuit which is between a signal of one of the wheels sensors assigned as the vehicle speed and a multiplier which multiplies the integrator's output signal with a factor to produce the threshold values. A circuit is provided for maintaining the output signal of the integrator in the acceleration circuit constant at the momentary value that it had at the start of the brake actuating signal during the duration of the brake actuation signal period. The integrating circuit for the slip threshold circuit includes circuitry for preventing the output signal of the integrating circuit of becoming larger than its input.

Other objects, advantages and novel features of the present invention will become apparent from the following detailed description of the invention when considered in conjunction with the accompanying drawings.

DETAILED DESCRIPTION OF THE DRAWINGS

Figure 1:
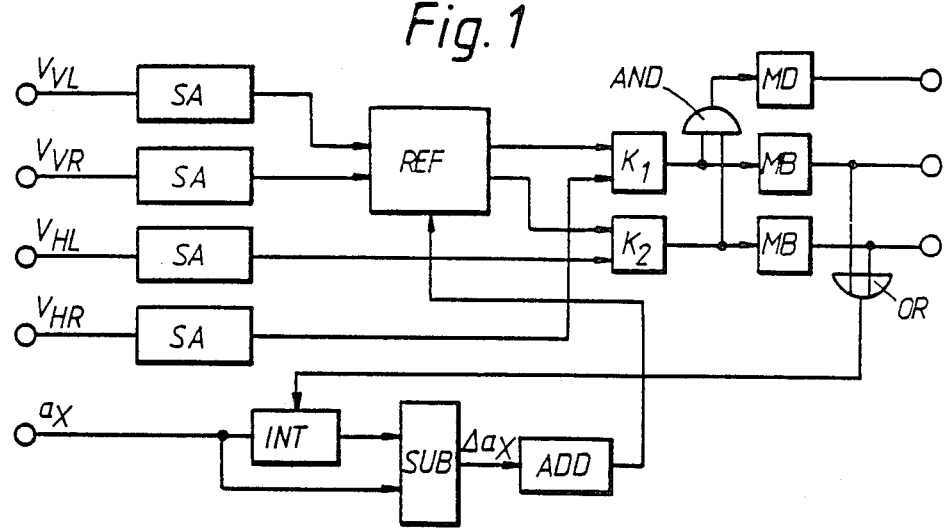
FIG. 1 is a block diagram of a wheel shift control system according to the principle of the present invention.
Figure 4:
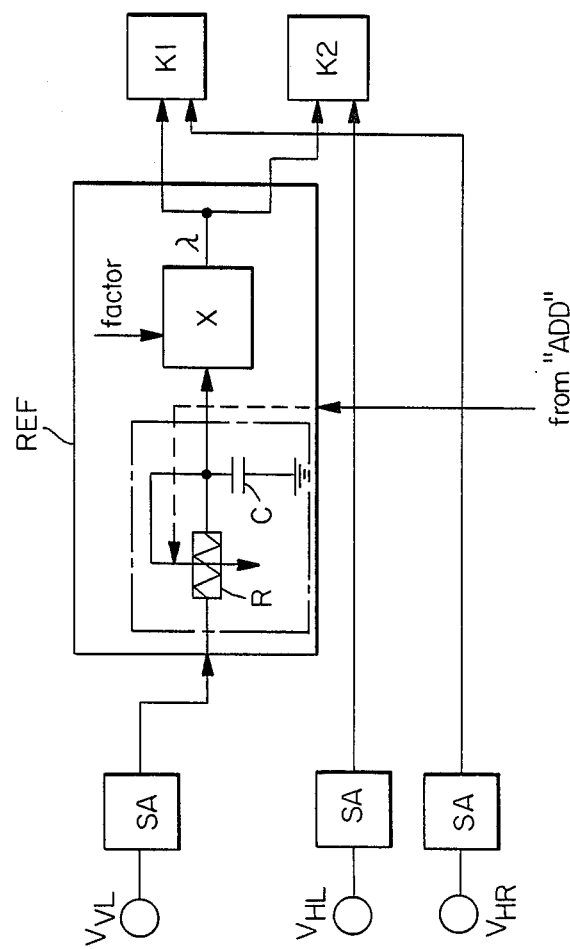
FIG. 4 is a block diagram of the REF circuit.

FIG. 1, in diagram form, shows a wheel slip control system for the rear wheels of a motor vehicle that has a permanent or a connectable all-wheel drive. The signals of the speed sensors $V_{VL}$, $V_{VR}$ of the front wheels and $V_{HL}$, $V_{HR}$ of the rear wheels are each fed through a signal processing circuit SA where they are converted into speed-proportional signals. Subsequently the processed signals $V_{VL}$ and $V_{LR}$ of the front wheels are fed to a circuit REF for the forming of the slip threshold values. The REF circuit, in the case of vehicles with single-axle drive, uses the wheel speed of a wheel that is not driven as an analog signal for the driving speed. This signal is then multiplied by a certain factor in order to obtain the desired slip threshold value for the driven wheel that is to be controlled. This slip threshold value is determined either jointly for both driven wheels or for each side of the vehicle separately. In the case of all-wheel drive, this signal, as mentioned previously can be erroneous. An integrating circuit, is therefore provided in the signal path in front of the multiplication circuit. The speed signal of the front wheel or of the front wheels is integrated in the integrating circuit with a time constant that can be changed by a control quantity that will be described later. In this case, it is ensured that the integrated output quantity of the integrating circuit, namely the driving speed reference signal $V_{REF}$, can never be larger than the corresponding input quantity. Details of the REF circuit are shown in FIG. 4 for using only one front wheel ($V_{VL}$). If both front wheel signals $V_{VL}$ and $V_{VR}$ are used, two reference circuits could be used. After the multiplication with the mentioned factor, the integrated signal forms the slip threshold value for one or both wheels to be controlled by the wheelslip control. This signal or these signals, as desired values, are compared at two comparators K1 and K2 with the speed signals $V_{HL}$ and $V_{HR}$ of the wheels to be controlled.

Each of the two comparators K1 and K2 emits an output signal when the speed signal of the assigned wheel is higher than the slip threshold value. This output signal acts on the braking torque regulator MB of this wheel. An AND-gate, the inputs of which are connected with the outputs of the two comparators K1 and K2, emits an output signal to the engine torque regulator MD which acts on the power control element of the vehicle engine (not shown). In the case of an internal-combustion engine, the power control element is the throttle valve.

In addition, an analog longitudinal acceleration sensor determines the longitudinal acceleration of the vehicle and provides a signal $a_x$. Its output signal is integrated by an integrator INT. The output signal of the integrator INT and that of the longitudinal acceleration sensor $a_x$ are fed to a subtracter SUB, the output signal of which is proportional to the difference $\Delta a_x$. A value that is assigned to a certain acceleration, such as 0.2 g, is added to the output signal $\Delta a_x$ in an adder ADD. The output signal of the adder ADD is the control quantity for the time constant of the above-described integrating circuit in the REF circuit for the formation of the threshold values.

The adding of an acceleration value, in this case 0.2 g, is advantageous so that in the case of a course of the road that starts flat and changes into a steep incline, the increase of the reference speed on which the slip threshold is based is not smaller than that of the vehicle speed.

The integrator INT is designed in such a way that its output signal is kept constant during the occurrence and duration of a control signal of the propulsion control system for the brakes of the wheels to be controlled. For this purpose, the outputs of the braking torque regulator MB are connected via an OR-gate to the integrator INT and causes this keeping constant. It is also conceivable to switch the integrator INT by means of the output signal of the OR-gate to a large time constant which would have the same effect.

The output signal of the adder ADD ($\Delta a_x + 0.2$ g) affects the integrating circuit of the arrangement REF in such a way that with an increasing output signal, the time constant is decreased. Namely, in the case of a higher longitudinal acceleration of the vehicle, the reference speed on which the slip threshold formation is based and that is obtained from the front wheel speeds, which are also slip-affected, rises faster than if a lower longitudinal acceleration is measured.

Figure 2:
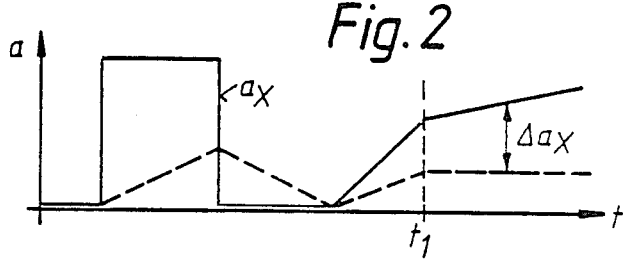
FIG. 2 is a graph of the longitudinal acceleration as a function of time.

FIG. 2 shows the time sequence of the acceleration signal $a_x$, in a solid line, as well as of the integrated signal, in dashed line, and of the difference $\Delta a_x$. In the case of a sudden change of the acceleration $a_x$, the integrated signal, follows with a time delay. If, at the point in time $t_1$ an output signal of the OR-gate appears, the value that is present at that moment, is kept at the output of the integrator INT as long as this signal is present. The difference $\Delta a_x$ appears at the output of the subtracter SUB. The constant value for 0.2 g added in the adder ADD, is not shown in FIG. 2. The output signal of the adder ADD is the control signal for the time constant of the integrating circuit that changes in an approximately inversely proportional to it.

Figure 3:
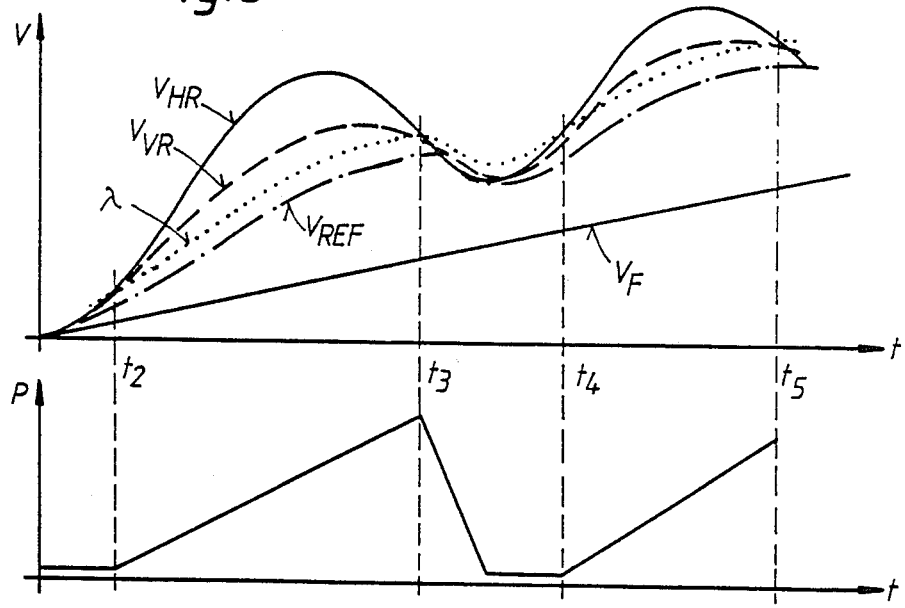
FIG. 3 are graphs of the speeds and of the brake pressure as a function of time.

FIG. 3, in a simplified way, shows the time sequence of the motor vehicle speed $V_F$, of the speed of a rear wheel $V_{HR}$, of the speed of the front wheel $V_{VR}$ assigned to the same side of the vehicle, of the reference speed $V_{REF}$ integrated from the front wheel speed $V_{VR}$ and of the slip threshold value $\lambda$ determined from the reference speed. Underneath, the graph of the braking pressure P is shown for the control of the right rear wheel that is assigned to these quantities. What is shown is a starting operation in the case of an all-wheel drive with spinning wheels. In this case, the speed $V_{HR}$ of the right rear wheel (solid line) deviates very extensively from the vehicle speed $V_F$ (solid line). The speed $V_{VR}$ of the right front wheel (dashed line), because of the slip, also deviates from the actual driving speed $V_F$. The integrated reference speed $V_{REF}$ (dash-dotted), in a delayed way, follows the speed $V_{VR}$. Also the slip threshold $\lambda$ (dotted line) derives from it.

In the point in time $t_2$, when the speed $V_{Hr}$ exceeds the slip threshold $\lambda$, the pressure P in the wheel brake of the right rear wheel starts to rise. Because of this brake pressure, the speed of the wheel decelerates again and, at the point in time $t_3$, falls below the slip threshold $\lambda$, upon which the brake pressure falls again. With the falling speed $V_{VR}$ of the right front wheel, the reference speed $V_{REF}$ is also lowered, because, as already mentioned, it can never be higher than the assigned wheel speed. At the point in time $t_4$, a new control cycle starts, with an exceeding of the slip threshold $\lambda$ by the rear wheel and a resulting rise of braking force in its wheel brake. At the point in time $t_5$ there again is a falling below the slip threshold and the brake pressure decreases, and so on. Possible pressure-maintaining phases, as they are known from any braking pressure control, were not shown here for reasons of clarity, but are definitely contained in practical embodiments.

The above elements that are called an integrating circuit and an integrator, are essentially filters, such as low-pass filters or attenuators.

Although the present invention has been described and illustrated in detail, it is to be clearly understood that the same is by way of illustration and example only, and is not to be taken by way of limitation. The spirit and scope of the present invention are to be limited only by the terms of the appended claims.

What is claimed:

1. In a propulsion control system for preventing an undesirable spinning of the wheels of a vehicle that are to be controlled, particularly of a motor vehicle equipped with multi-axle drive, having a plurality of sensor means for providing speed signals indicative of the sensed speed of the associated wheels, having a threshold means for forming slip threshold value, having a slip comparator means assigned to each wheel to be controlled for comparing the sensed speed signal of the wheel to be controlled with the assigned slip threshold value, having means for activating the brake of a wheel to be controlled when said wheel tends to spin, having means for reducing the output torque of the vehicle engine when the wheels of both vehicle sides that are to be controlled tend to spin, and having measuring means for measuring the longitudinal acceleration of the vehicle, the improvement comprising:

an integrator means for integrating the output signal of the measuring means for the longitudinal acceleration of the vehicle, a subtractor means for forming the difference of the output signals of the measuring means for the longitudinal acceleration of the vehicle and of the integrator means, an adder means for adding to the output signal of the subtractor a constant value assigned to a certain acceleration value, and said threshold means for forming the slip threshold value by assigning one of said speed signals of one of said plurality of sensor means as the driving speed and multiplying the assigned speed signal with a factor to produce the slip threshold value, said threshold means includes an integrating circuit for integrating the assigned speed signal with a time constant represented by the output signal of the adder means before multiplying.

2. A system according to claim 1, including means for maintaining the output signal of the integrator means constant at the momentary value that the output signal had at the start of a brake-actuating signal and during the duration of said brake-actuating signal.

3. A system according to claim 1, including means in said integrating circuit for preventing the output signal of the integrating circuit from becoming larger than its input signal.

4. A system according to claim 1, wherein said threshold means assigns one of said sensed speed signals of one of said sensor means as the driving speed per side of the vehicle and a separate integrating circuit is provided for each side of said vehicle.

* * * * *